United States Patent [19]

Kim

[11] Patent Number: 5,208,707
[45] Date of Patent: May 4, 1993

[54] CIRCUIT FOR MAINTAINING COMPATIBILITY BETWEEN DIFFERENT IMAGE SYSTEMS DURING REPRODUCTION HAVING AN ADAPTIVE DE-EMPHASIS UNIT

[75] Inventor: Yong-je Kim, Suwon, Rep. of Korea

[73] Assignee: Samsung Electronics Co., Ltd., Kyungki, Rep. of Korea

[21] Appl. No.: 737,685

[22] Filed: Jul. 30, 1991

[30] Foreign Application Priority Data

Oct. 31, 1990 [KR] Rep. of Korea .................. 90-17586
Jul. 19, 1991 [KR] Rep. of Korea .................. 91-12411

[51] Int. Cl.$^5$ .............................................. H04N 5/78
[52] U.S. Cl. ................................. 360/33.1; 358/138
[58] Field of Search ............... 360/33.1, 32, 9, 8, 360/27, 30; 358/138, 167, 39, 310, 335, 315, 316, 340, 330; 375/97, 113

[56] References Cited

U.S. PATENT DOCUMENTS 4,831,463  5/1989  Faroudja ............................ 358/310
5,084,767  1/1992  Watanabe et al. ................. 358/330
5,161,030  11/1992 Song .................................. 358/330

FOREIGN PATENT DOCUMENTS

0471517A2  2/1992  European Pat. Off. .

Primary Examiner—Edward P. Westin
Assistant Examiner—Que T. Le
Attorney, Agent, or Firm—Robert E. Bushnell

[57] ABSTRACT

Disclosed is a circuit for maintaining compatibility between different image signal recording/reproducing systems. An adaptive de-emphasis unit is attached to the output of the folding frequency information detector of an improved circuit for maintaining compatibility between image signal recording/reproducing systems, in order to restore the signal adaptively emphasized by the adaptive emphasis unit during recording as stated above, to the original signal to prevent degradation in image quality. The adaptive de-emphasis unit comprises a soft switch, a horizontal high-pass filter, a horizontal low-pass filter, a level detector and a lookup table.

7 Claims, 3 Drawing Sheets

CIRCUIT FOR MAINTAINING COMPATIBILITY BETWEEN DIFFERENT IMAGE SYSTEMS DURING REPRODUCTION HAVING AN ADAPTIVE DE-EMPHASIS UNIT

BACKGROUND OF THE INVENTION

This invention relates to a circuit for maintaining compatibility between different image signal recording/reproducing systems during reproduction. This invention relates more particularly to an improvement on the invention titled "Improved image signal recording system" of U.S. patent application Ser. No. 07/659,029, filed Aug. 17, 1990 by this applicant.

At present, the image signal recording/reproducing system used in the home, records image signals on video cassette tapes according to one of several methods. Conventional VHS systems (referred to as standard VHS system) have insufficient horizontal resolution, and the image quality is degraded. Generally, the improved VHS system, called super VHS (S-VHS), provides an improved image quality by recording the image signal of full bandwidths on the video cassette tape.

Such systems require superior quality of tapes and recording/reproducing systems. However, the above S-VHS system is incompatible with a VCR of the standard VHS system. A VCR according to the S-VHS system is able to reproduce images recorded by the VCR's of both the S-VHS and the standard VHS systems, but a VCR according to the standard VHS system is unable to reproduce images recorded by the S-VHS system.

Therefore, the above U.S. patent application Ser. No. 07/569,029 removes the conventional drawbacks stated above, and provides an improved image signal recording system designed to have reverse compatibility with the standard VHS method.

However, the image signal recording system described in the above U.S. patent application Ser. No. 07/569,029 is unable to obtain the desired specific characteristics by analog processing of the signal in the de-emphasis unit during reproduction.

Of particular note, in the above system, when the adaptively folded signal passes through the de-emphasis unit connected to the input f the decoder, accurate reproduction of the recorded signal is difficult, and if the characteristic of the de-emphasis unit is not good, high-frequency components of the adaptively folded signal are degraded. Moreover, when the above adaptively folded signal is unfolded in the unfolding unit, the high frequency components in the signal bandwidths unfolded in double are attenuated, reducing resolution during reproduction.

SUMMARY OF THE INVENTION

Therefore, it is an object of this invention to provide a circuit for maintaining compatibility between different image signal recording/reproducing systems during reproduction in order to reproduce image signals recording/reproducing system without degrading the image quality during reproduction.

It is another object of this invention to provide a circuit for maintaining compatibility between different image signal recording/reproducing systems during reproduction which reduces high frequency noise, e.g., that which is introduced in the magnetic recording medium.

To accomplish the above objects, a preferred embodiment of a circuit for maintaining compatibility between image signal recording/reproducing systems according to this invention comprises:

an A/D converter for converting the input composite image signals into digital signals;

a folding frequency information detector for determining whether the digital signal from the A/D converter employs frequency folding;

an adaptive de-emphasis unit for de-emphasizing the frequency folded signal from the detector;

an unfolding unit for unfolding the adaptively de-emphasized frequency band;

a luminance signal reconstruction unit for removing a folding carrier generated during frequency folding and for removing undesirable residual signals generated from a demodulator during reproducing;

an adaptive reemphasis unit for emphasizing high frequency signal components of the reconstructed luminance signal; and a D/A converter for converting the digital signal from the above adaptive reemphasis unit into an analog signal.

Also, in the circuit for maintaining compatibility stated above, the adaptive de-emphasis unit comprises:

a soft switch for regulating an amount of mixture of the luminance signal components according to the level of the input signal;

a horizontal high-pass filter for passing horizontal high-frequency components of the luminance signal;

a horizontal low-pass filter for passing horizontal low-frequency components of the luminance signal;

a level detector connected to the horizontal high pass filter and for detecting the components having a magnitude greater than a specified magnitude of the high frequency components passing through the horizontal high pass filter; and a lookup table connected to the level detector for attenuating only high-frequency components of the non-folded signal.

BRIEF DESCRIPTION OF THE DRAWINGS

The above objects and other advantages of the present invention will become more apparent by describing the preferred embodiment of the present invention with reference to the attache drawings.

DETAILED DESCRIPTION OF THE INVENTION

A preferred embodiment of the circuit for maintaining compatibility during reproduction between different image signal recording/reproducing systems according to this invention will be described below in detail with reference to the accompanying drawings.

First, before describing an improved circuit for maintaining compatibility according to this invention, a conventional circuit for maintaining compatibility will be described briefly.

Figure 1:
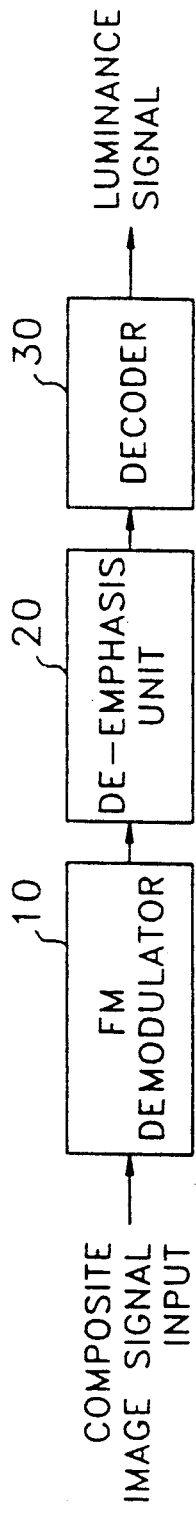
FIG. 1 is a block diagram of a conventional image signal processing system for maintaining compatibility between image signal recording/reproducing systems during reproduction.

FIG. 1 is a block diagram of a conventional image signal processing system for maintaining compatibility between image signal recording/reproducing systems during reproduction, wherein the composite image signal passes through the FM demodulator 10, is de-emphasized in the de-emphasis unit 20, and is fed to the decoder 30. Then the decoder 30 receives the signal which is FM demodulated in the FM demodulator 10 and de-emphasized in the de-emphasis unit 20, and generates a luminance signal.

The output signal from decoder 30 is mixed with the chrominance signal to be supplied as a composite image signal. The processing of the chrominance signal has been omitted in FIG. 1 for the sake of simpler illustration.

Figure 2:
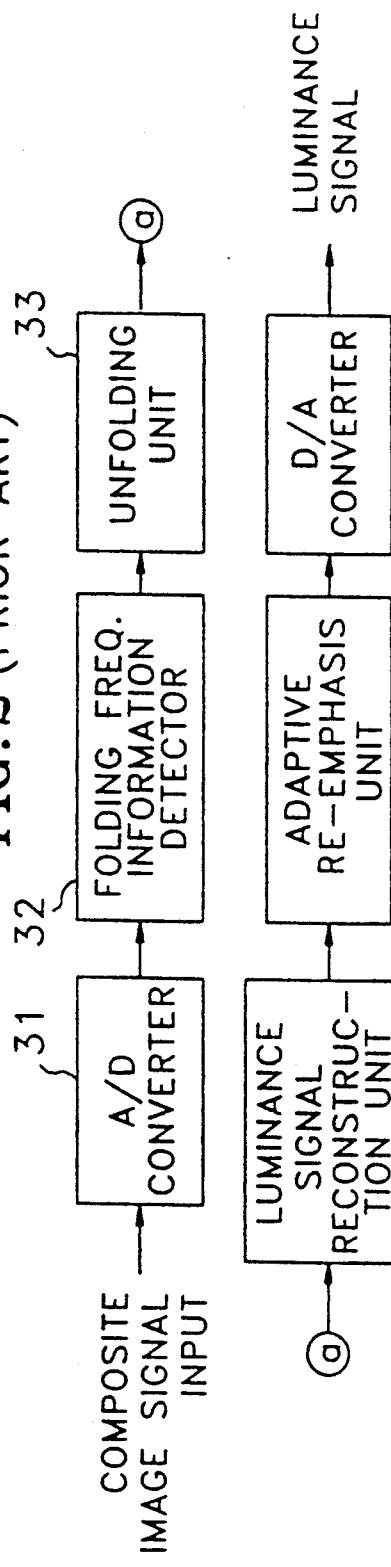
FIG. 2 is a more detailed block diagram of the decoder shown in FIG. 1.

FIG. 2 shows a more detailed block diagram of the decoder 30 shown in FIG. 1.

As shown in FIG. 2, when the composite image signal is supplied to the decoder 30, it si converted into a digital signal via the A/D converter 31, then supplied to folding frequency information detector 32 which determines whether frequency folding has been employed.

Next, the folding frequency from the detector 32 is inputted to the unfolding unit 33 and, after being spread into twice the original, has the folding carrier and undesired residual signals generated in the demodulator during reproducing, removed in the luminance signal reconstruction unit 34, and is inputted into the adaptive reemphasis unit 35 where the high frequency component of the luminance signal is emphasized, and the result is inputted into the D/A converter 36 for conversion into an analog signal.

Figure 8A:
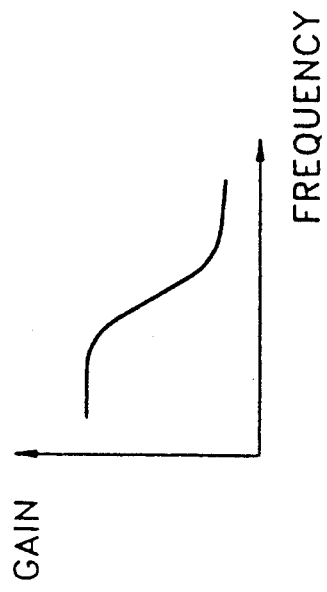
FIG. 8A is a waveform graph for the output signal during reproduction of the recorded signals as shown in FIG. 7 according to a conventional image signal recording/reproducing system.

However, according to the conventional circuit above, it is difficult to achieve adaptive de-emphasis of the same magnitude as the amount that is adaptively emphasized during reproduction in an improved image signal recording/reproducing system, and consequently, the high frequency component is degraded during unfolding as shown in FIG. 8A, and undesirable artifact effects are generated on the screen.

Figure 3:
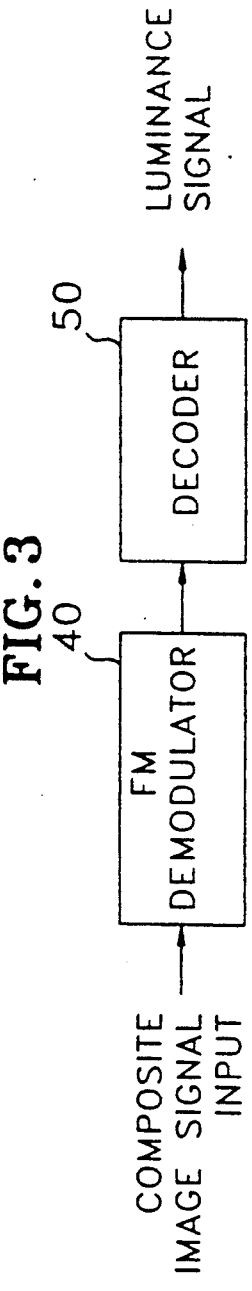
FIG. 3 is a block diagram of an improved image signal recording/reproducing system according to this invention.
Figure 4:
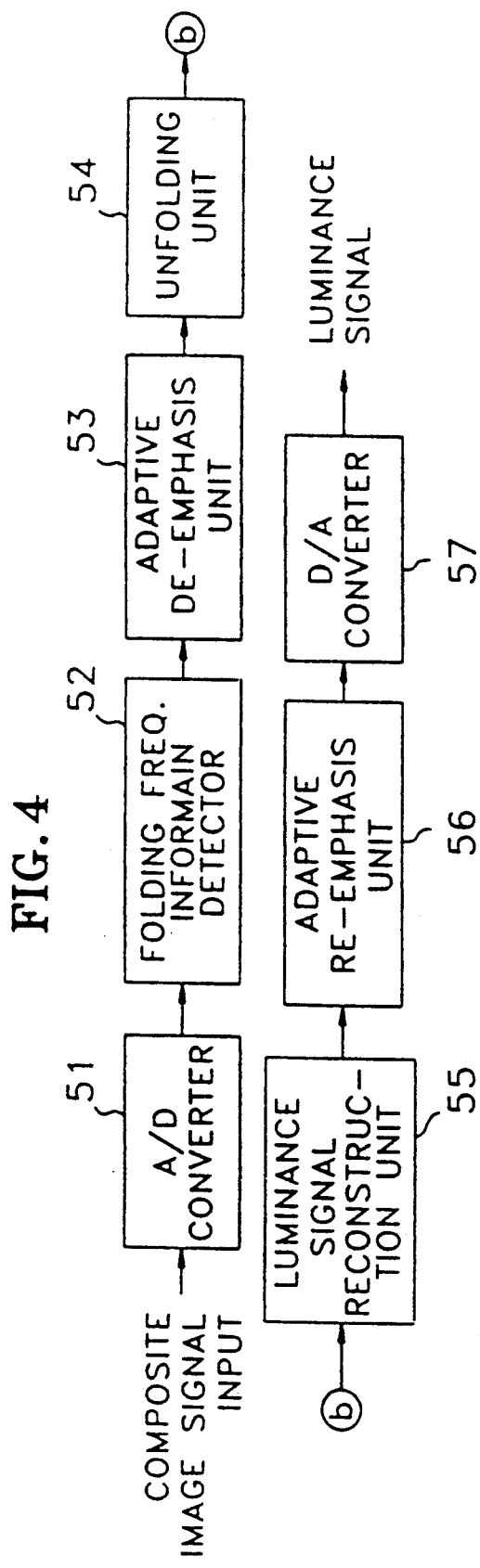
FIG. 4 is a more detailed block diagram of the decoder shown in FIG. 3.
Figure 5:
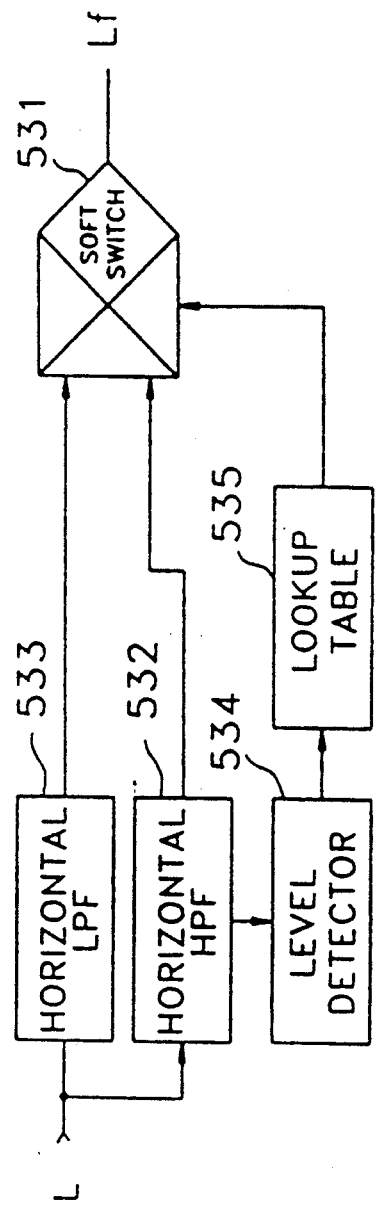
FIG. 5 is a more detailed block diagram of the adaptive de-emphasis unit shown in FIG. 4.

Therefore, this invention aims to remove the above conventional disadvantages, and an improved circuit for maintaining compatibility during reproduction between image signal recording/reproducing systems according to this invention is as shown in FIG. 3 through 5, and comprises :

an A/D converter 51 for converting composite image signals input digital signals;

a folding frequency information detector 52 for determining whether the digital signal from the A/D converter employs frequency folding;

an adaptive de-emphasis unit 53 for de-emphasizing the frequency folded signal from the detector;

an unfolding unit 54 for unfolding the adaptively de-emphasized frequency band;

a luminance signal reconstruction unit 55 for removing the folding carrier generated during frequency folding, and for removing undesirable residual signals generated in the demodulator during reproducing;

an adaptive reemphasis unit 56 for emphasizing the high frequency component of the reconstructed luminance signal; and a D/A converter 57 for converting the digital signal from the adaptive reemphasis unit 56 into an analog signal.

Also, the adaptive de-emphasis unit 53 is as shown in FIG. 5 and comprises:

a soft switch 531 for regulating an amount of mixture of the luminance signal component according to the level of the input signal, a horizontal high-pass filter 532 for passing the horizontal high-frequency component of the luminance signal, a horizontal low-pass filter 533 for passing the horizontal low-frequency component of the luminance signal, a level detector 534 connected to the horizontal high-pass filer 532 and for detecting the components having a magnitude greater than a specified magnitude of the high-frequency component passing through the horizontal high-pass filter 532, and a lookup table 535 connected to the level detector 534 and for attenuating only the high-frequency component of the folded signal.

An improved circuit for maintaining compatibility according to this invention, which is constituted as above, has the adaptive de-emphasis unit 53 connected to the output of the folding frequency information detector 52, and operated by a digital signal, and by assuming characteristics exactly opposite to those of the adaptive reemphasis unit used during recording according to an improved image signal recording/reproducing system, original signals are reproduced without degradation of high-frequency components folded during recording.

As follows, the operation of an improved circuit for maintaining compatibility according to this invention, which is constituted as above, is described below with reference to FIGS. 4 through 8.

Figure 7:
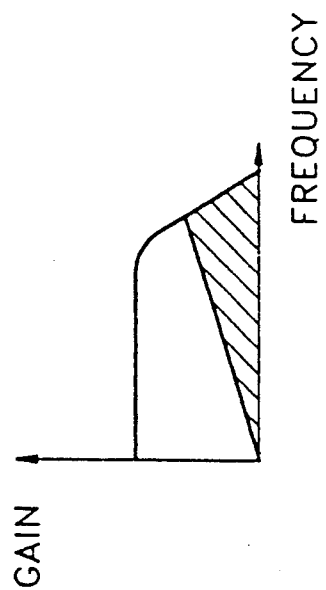
FIG. 7 is a waveform graph for the output signals recorded according to an improved image signal recording/reproducing system.
Figure 8B:
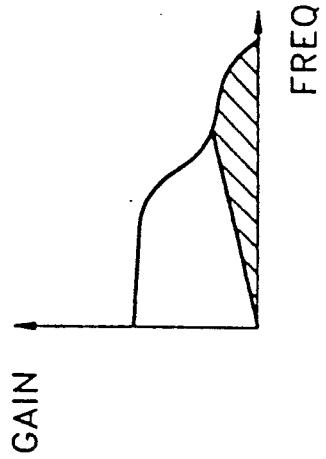
FIG. 8B is a waveform graph for the output signal during reproduction of the recorded signals as shown in FIG. 7 according to an image signal recording/reproducing system of the present invention.

First, in the recording process by an improved image signal recording/reproducing system which is to be reproduced by a image signal recording/reproducing system according to this invention, folded signal in which specified high frequencies have been emphasized is recorded in a form in which high-frequency components are emphasized as shown in FIG. 7. The hatched regions of FIG. 7, FIG. 8A and FIG. 8B represent frequency folded shapes. Therefore, when an adaptively folded and reemphasized signal recorded by an improved image signal recording system as shown in FIG. 7 is inputted, it is converted to a digital signal through the A/D converter 51, and is inputted to the adaptive de-emphasis unit 53 through the folding frequency information detector 52 as shown in FIG. 4.

That is, when a composite image signal of the waveform shown in FIG. 7 is inputted to the adaptive de-emphasis unit 53, the input signal is inputted to the horizontal high-pass filter 532 for extracting the high-frequency component of the input signal, and the high frequency components are detected, and after passing through the level detector 534 for detecting the signal magnitude of the components, are inputted to the lookup table 535.

Figure 6:
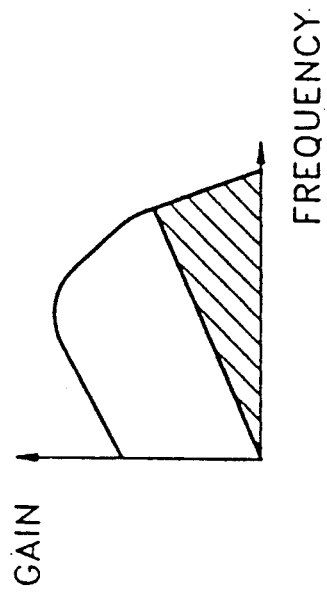
FIG. 6 is a waveform graph for the output of the lookup table shown in FIG. 5.

The lookup table 535 attenuates the signal from the level detector 534, as represented by the waveform of FIG. 6, and inputs this signal to the soft switch 531.

The soft switch 531 mixes the signal from the horizontal high pass filter 532 and the signal from the horizontal low pass filter 533, according to the signal output from the lookup table 535 and outputs an undegraded signal as shown in FIG. 8B.

An adaptive de-emphasis unit according to this invention has a basic constitution similar to that of conventional adaptive emphasis circuits, but by setting the proportion coefficients of the lookup table differently, that is, reciprocally, different output waveforms are generated.

Also, when an image signal is reproduced by a image signal recording/reproducing system provided with an adaptive de-emphasis unit according to this invention, even if noise is introduced into the magnetic recording medium and recorded, high-frequency noise is attenuated, automatically removing the noise.

What is claimed is:

1. An improved circuit for maintaining compatibility between different image signal recording/reproducing systems comprising:
    an A/D converter for converting the input composite image signals into digital signals;
    a folding frequency information detector for determining whether the digital signal from said A/D converter employs frequency folding;
    an adaptive de-emphasis unit for de-emphasizing the folding frequency from said detector;
    an unfolding unit for spreading said adaptively de-emphasized frequency band;
    a luminance signal reconstruction unit for removing the folding carrier generated during frequency folding and for removing undesirable residuals generated from the demodulator during reproducing;
    an adaptive reemphasis unit for emphasizing the high-frequency signal component of said reconstructed luminance signal; and
    a D/A converter for converting the digital signal from said adaptive reemphasis unit into analog signal.

2. An improved circuit for maintaining compatibility between different image signal recording/reproducing systems as claimed in claim 1, wherein said adaptive de-emphasis unit comprises:
    a soft switch for regulating an amount of mixture of the luminance signal components according to the level of the input signal;
    a horizontal high-pass filter for passing the horizontal high-frequency component of the luminance signal;
    a horizontal low-pass filter for passing the horizontal low-frequency component of the luminance signal;
    a level detector connected to said horizontal high-pass filter for detecting the components having magnitudes greater than a specified magnitude of the high-frequency components passing through said horizontal high-pass filter; and
    a lookup table connected to said level detector for attenuating only the high-frequency component of the folded signal.

3. An improved circuit for maintaining compatibility between different image signal recording/reproducing systems as claimed in claim 1, wherein said adaptive de-emphasis unit attenuates only high frequency components of adaptively folded luminance signal.

4. An improved circuit for maintaining compatibility between different image signal recording/reproducing systems as claimed in claim 1, wherein said adaptive de-emphasis unit during reproduction, automatically attenuates high-frequency noise introduced onto the magnetic recording medium during recording.

5. An improved circuit for maintaining compatibility between different image signal recording/reproducing systems as claimed in claim 2, wherein said adaptive de-emphasis unit attenuates only high frequency components of adaptively folded luminance signal.

6. An improved circuit for maintaining compatibility between different image signal recording/reproducing systems as claimed in claim 2, wherein said adaptive de-emphasis unit during reproduction, automatically attenuates high-frequency noise introduced onto the magnetic recording medium during recording.

7. An improved circuit for maintaining compatibility between different image signal recording/reproducing systems as claimed in claim 3, wherein said adaptive de-emphasis unit during reproduction, automatically attenuates high-frequency noise introduced onto the magnetic recording medium during recording.

* * * * *

UNITED STATES PATENT AND TRADEMARK OFFICE
CERTIFICATE OF CORRECTION

PATENT NO. : 5,208,707
DATED : May 4, 1993
INVENTOR(S) : Yong-Je Kim

It is certified that error appears in the above-indentified patent and that said Letters Patent is hereby corrected as shown below:

Column 1

Line 14,    change Serial No. "07/659,029" to -- 07/569,029 --;

Column 3

Line 38,    after "it", change "si" to -- is --:

Signed and Sealed this

Fifth Day of September, 1995

Attest:

BRUCE LEHMAN

Attesting Officer    Commissioner of Patents and Trademarks